US012774807B2

(12) United States Patent
Shi et al.

(10) Patent No.: US 12,774,807 B2
(45) Date of Patent: Oct. 27, 2026

(54) SPLIT-TYPE FAN LAMP STRUCTURE

(71) Applicant: Jiangmen Oumeiqi Lighting Appliance Co., Ltd, Jiangmen City (CN)

(72) Inventors: Quanwei Shi, Jiangmen City (CN); Jinwu Zhu, Jiangmen City (CN)

(73) Assignee: Jiangmen Oumeiqi Lighting Appliance Co., Ltd, Jiangmen City (CN)

(*) Notice: Subject to any disclaimer, the term of this patent is extended or adjusted under 35 U.S.C. 154(b) by 0 days.

(21) Appl. No.: 19/328,904

(22) Filed: Sep. 15, 2025

(65) Prior Publication Data

US 2026/0085832 A1 Mar. 26, 2026

(30) Foreign Application Priority Data

Sep. 24, 2024 (CN) ........................ 202422336086.7

(51) Int. Cl.

| | |
|---|---|
| ***F21V 33/00*** | (2006.01) |
| ***F04D 25/08*** | (2006.01) |
| ***F04D 29/52*** | (2006.01) |
| ***F21S 8/04*** | (2006.01) |
| ***F21V 3/02*** | (2006.01) |
| ***F21V 17/12*** | (2006.01) |
| ***F21V 17/16*** | (2006.01) |
| *F21Y 115/10* | (2016.01) |

(52) U.S. Cl.
CPC ........ *F21V 33/0096* (2013.01); *F04D 25/088* (2013.01); *F04D 29/526* (2013.01); *F21S 8/04* (2013.01); *F21V 3/02* (2013.01); *F21V 17/12* (2013.01); *F21V 17/16* (2013.01); *F21Y 2115/10* (2016.08)

(58) Field of Classification Search
CPC ........ F21V 33/0096; F21V 3/02; F21V 17/12; F21V 17/16; F04D 25/088; F04D 29/526; F21S 8/04; F21Y 2115/10
See application file for complete search history.

(56) References Cited

U.S. PATENT DOCUMENTS

| | | | | |
|---|---|---|---|---|
| 2012/0045331 | A1 | 2/2012 | Villella | |
| 2021/0372425 | A1* | 12/2021 | Li | F04D 29/281 |
| 2024/0159390 | A1* | 5/2024 | Huang | F21V 33/0096 |

* cited by examiner

*Primary Examiner* — Bao Q Truong

(57) ABSTRACT

The present disclosure relates to the technical field of fan lamps, in particular to a split-type fan lamp structure. The split-type fan lamp structure comprises an installation housing; a fan blade structure is arranged below the installation housing, and an installation space is formed inside the installation housing for installing and arranging a driving mechanism; a driving end of the driving mechanism extends downwards through a clearance hole at the bottom of the installation housing and is connected to the fan blade structure; a plurality of lamp body modules are arranged outside the outer contour of the fan blade structure; the lamp body modules as a whole are designed to be elongated and curved with an arc-shaped structure; any two adjacent lamp body modules are connected by a connector, and a plurality of lamp body modules are assembled into an annular structure.

9 Claims, 6 Drawing Sheets

SPLIT-TYPE FAN LAMP STRUCTURE

CROSS-REFERENCE TO RELATED APPLICATIONS

This application claims priority to Chinese Patent Application No. 202422336086.7, filed on Sep. 24, 2024, which is incorporated herein by reference in its entirety.

TECHNICAL FIELD

The present disclosure relates to the technical field of fan lamps, in particular to a split-type fan lamp structure.

BACKGROUND

A fan lamp is an electrical appliance that combines the functions of a ceiling lamp and a ceiling fan. In addition to basic functions such as lighting and ventilation, most of the fan lamps also have decorative effects. Two common types of fan lamps are available on the market: traditional straight-blade fan lamps and invisible fan lamps.

In the existing structure, various components making up a fan lamp are usually processed and formed separately before they are assembled for use; however, due to the unreasonable structural design, the fan lamps of the existing structure are unable to be conveniently and rapidly assembled and disassembled, moreover, part of the lamp body structure is unable to be disassembled or the overall size remains large after disassembly, thereby resulting in a need for a larger packaging box structure during transportation and increased transportation costs.

SUMMARY

In view of the above defects in the prior art, the technical problem to be solved in the present disclosure is to provide a split-type fan lamp structure with a simpler and more reasonable structural design and capable of facilitating the disassembly and assembly of each part of the lamp and reducing the size of each part after disassembly to lower packaging and transportation costs.

To achieve the above objective, the present disclosure provides a split-type fan lamp structure, and the split-type fan lamp structure includes an installation housing, wherein a fan blade structure is arranged below the installation housing, and an installation space is formed inside the installation housing for installing and arranging a driving mechanism; a driving end of the driving mechanism extends downwards through a clearance hole at the bottom of the installation housing and is connected to the fan blade structure; a plurality of lamp body modules are arranged outside the outer contour of the fan blade structure; the lamp body modules as a whole are designed to be elongated and curved with an arc-shaped structure; any two adjacent lamp body modules are connected by a connector, and a plurality of lamp body modules are assembled into an annular structure; a supporting member is connected and fixed on the lamp body module; the supporting member as a whole is designed as an elongated structure, and the distal end of the supporting member is connected and fixed on the installation housing.

In this way, the above split-type fan lamp structure has the following characteristics: the installation housing, the fan blade structure, the lamp body modules, the connector and the supporting member are disassembled. After disassembly, each component has a smaller structural size, thereby facilitating packaging and transportation, and saving packaging and transportation costs; secondly, the fan blade structure and the lamp body modules are located in the same horizontal direction, so the structural arrangement is more reasonable. When assembled for use, the vertical size of the entire structure is more compact, thereby facilitating installation and saving installation space.

As an optimization, the lamp body module includes an installation member, the installation member as a whole is designed to be elongated and curved with an arc-shaped structure, and adjacent ends of any two installation members are connected by the connector; an installation groove is arranged on the lower surface of the installation member, and an LED lamp board is arranged in the installation groove; a lampshade block is installed below the installation member, and the lampshade block is designed to be elongated and curved with an arc-shaped structure.

In this way, by designing the installation members, connecting the installation members through connectors, arranging LED lamp boards in the installation grooves of the installation members, and then setting the lampshade blocks below the installation members, the structural design of the lamp body module is simpler and more reasonable, and the lighting effect is better.

As an optimization, a protruding portion is convexly arranged on the upper surface of the lampshade block, and the protruding portion is installed and matched in the installation groove of the installation member.

In this way, the structural design is simpler, and the installation and matching between the lampshade block and the installation member are more convenient. Further, a plurality of sets of clamping recesses are arranged in pairs on both sides of the matching protruding portion, clamping protrusions are respectively arranged on both side walls inside the installation groove corresponding to the clamping recesses, and each clamping protrusion is correspondingly clamped and matched in the clamping recess.

In this way, the installation and matching between the installation member and the lampshade block are more reasonable, and disassembly and assembly are more convenient.

As an optimization, the connector is designed as a rectangular tube structure, an end of the installation member protrudes to form a connecting portion, the connecting portion is designed as a rectangular tube structure, and the connecting portion is correspondingly inserted and matched in the connector.

In this way, the structural design of the connector is simpler and more reasonable, and two adjacent installation members are better connected.

Further, a connecting groove is arranged on the connecting portion along a circumferential direction of the connecting portion, and connecting convex edges are distributed on an inner circumferential surface of the connector along an inner contour of the connector. After the connecting portion is inserted and matched in the connector, the connecting convex edges are clamped and matched in the connecting groove to restrict the connecting portion from coming out of the connector.

In this way, the connection between the connector and the installation member is more reliable.

As an optimization, the connecting portion is provided with a vertically through deformed opening; a wedge-shaped convex edge is arranged on the upper surface inside the connector and corresponds to the deformed opening; and after the connecting portion is inserted and matched in the connector, the wedge-shaped convex edge is inserted and matched in the deformed opening to make the connecting portion deform and expand.

In this way, the reliability of the connection between the connector and the installation member is further improved.

As an optimization, a connecting notch is formed on the upper surface of the middle part of the installation member, the upper end and the inner side of the connecting notch are designed to be open; a connecting block is arranged at one end of the supporting member and corresponds to the connecting notch, and the connecting block is connected and matched in the connecting notch through screws.

In this way, the connection and fixation between the supporting member and the installation member are more convenient.

As an optimization, the other end of the supporting member is provided with a fixing block, and the fixing block is attached to the outer circumferential surface of the installation housing; a matching block is arranged in the middle of the surface of the fixing block opposite to the installation housing, and matching grooves are arranged on both sides of the matching block; the installation housing includes a housing, the housing as a whole is designed as a circular structure with an open upper end, and the open end of the housing is formed with a matching opening, and the matching grooves on both sides of the matching block are clamped and matched on both sides of the matching opening; the lower end of the fixing block is provided with a fixing protrusion, the fixing protrusion extends into the interior of the housing from the matching opening, and the fixing protrusion is connected and fixed on a fixing column inside the housing by a fixing screw.

DETAILED DESCRIPTION OF THE EMBODIMENTS

Figure 1:
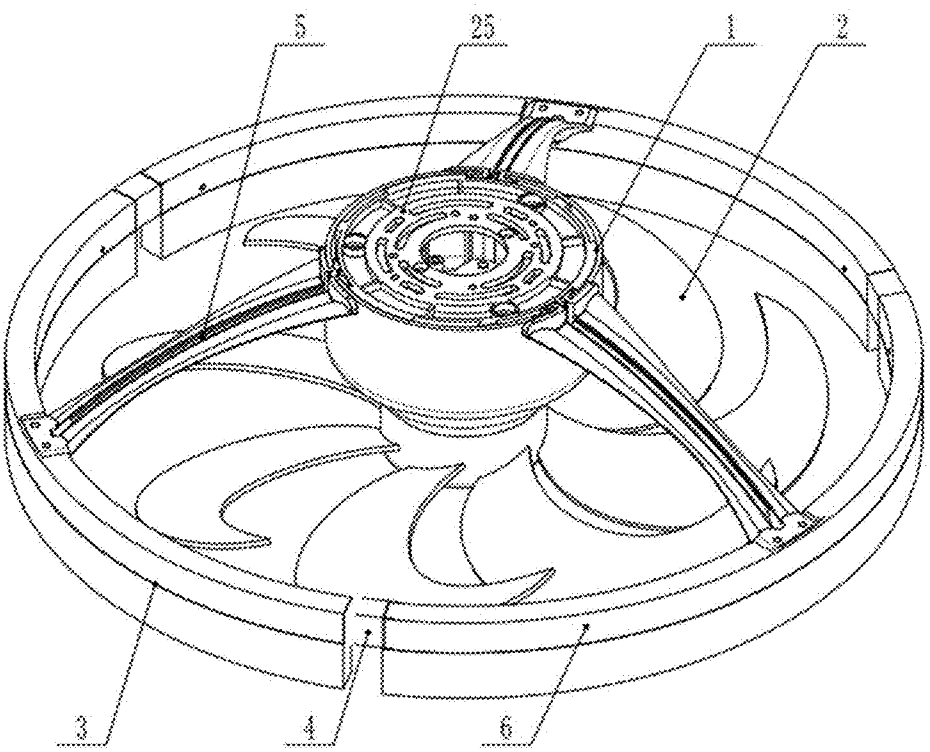
FIG. 1 is a structural schematic diagram of a fan lamp in a specific embodiment of the present disclosure.
Figure 2:
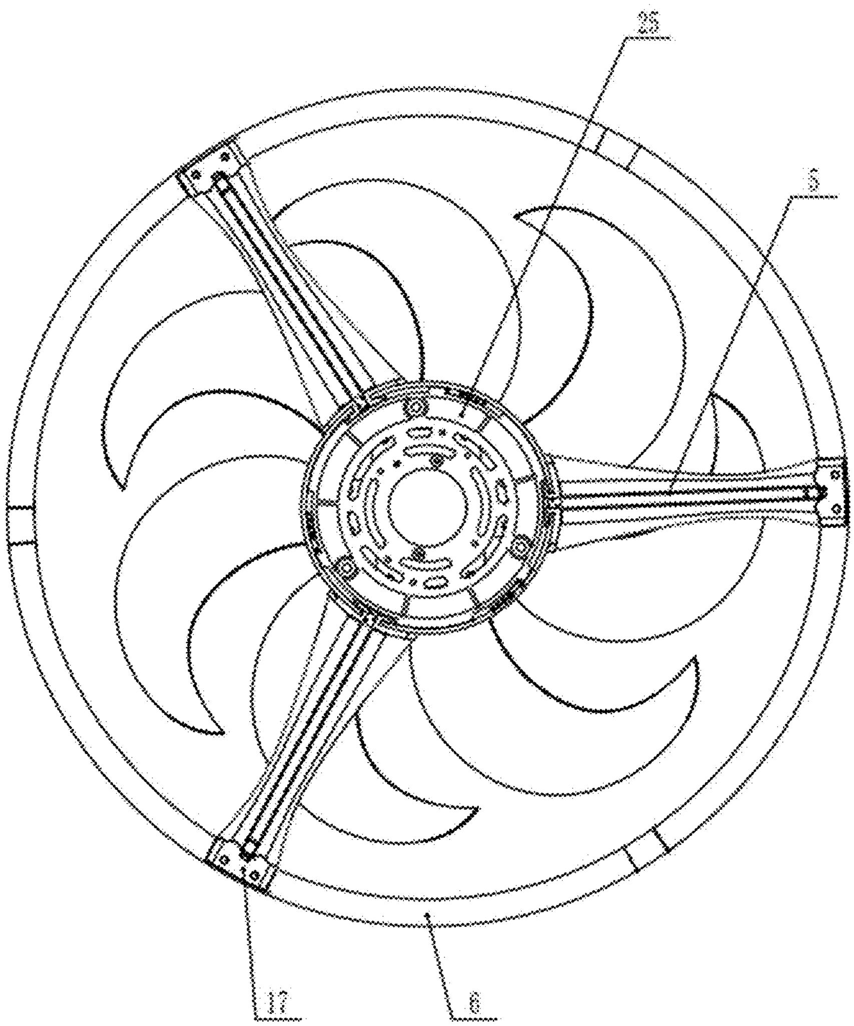
FIG. 2 is a top view of FIG. 1.
Figure 3:
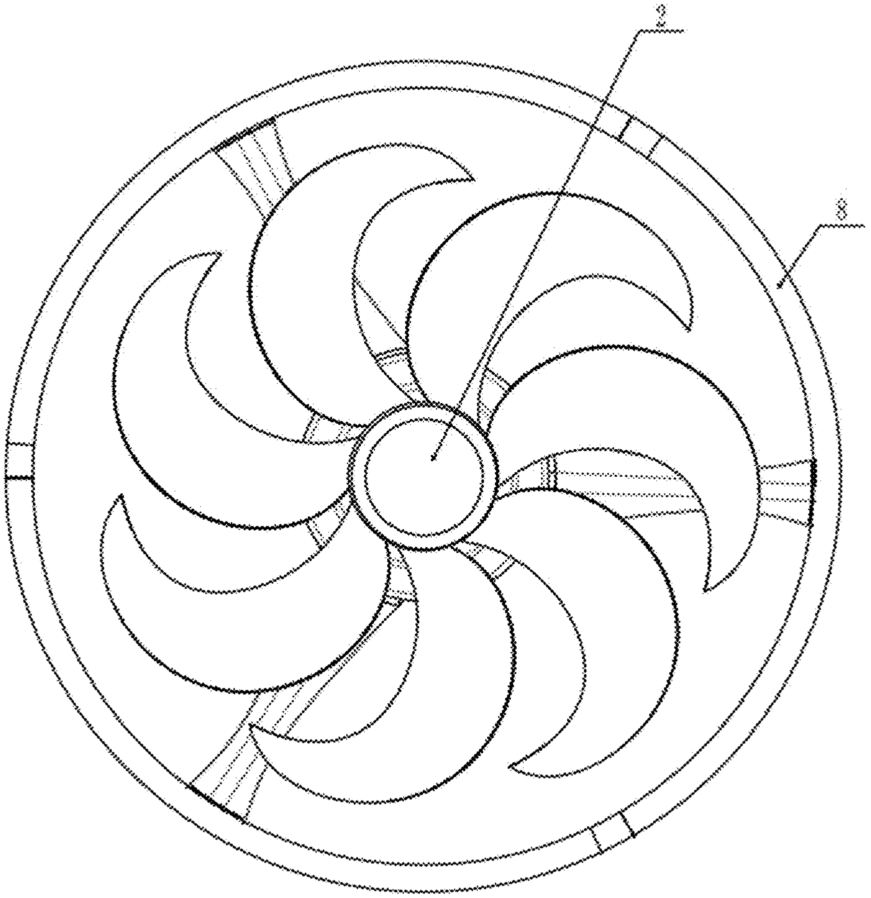
FIG. 3 is a bottom view of FIG. 1.
Figure 4:
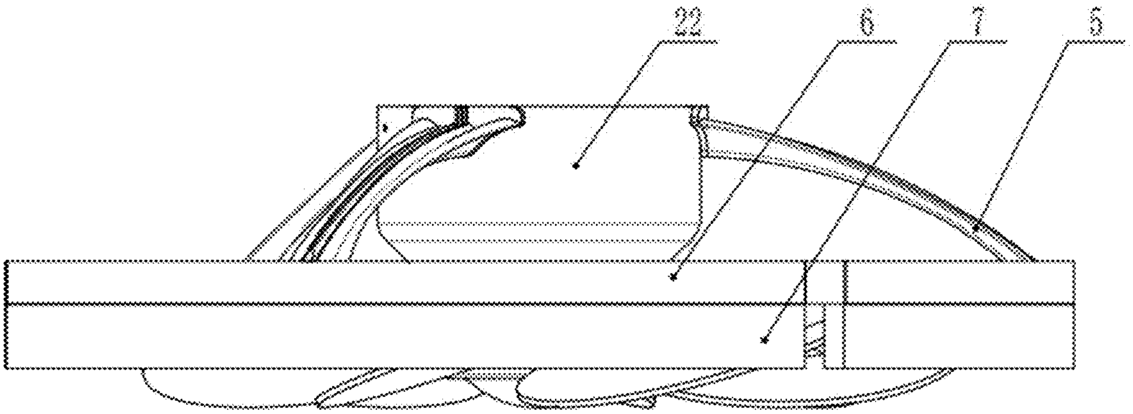
FIG. 4 is a front view of FIG. 1.
Figure 5:
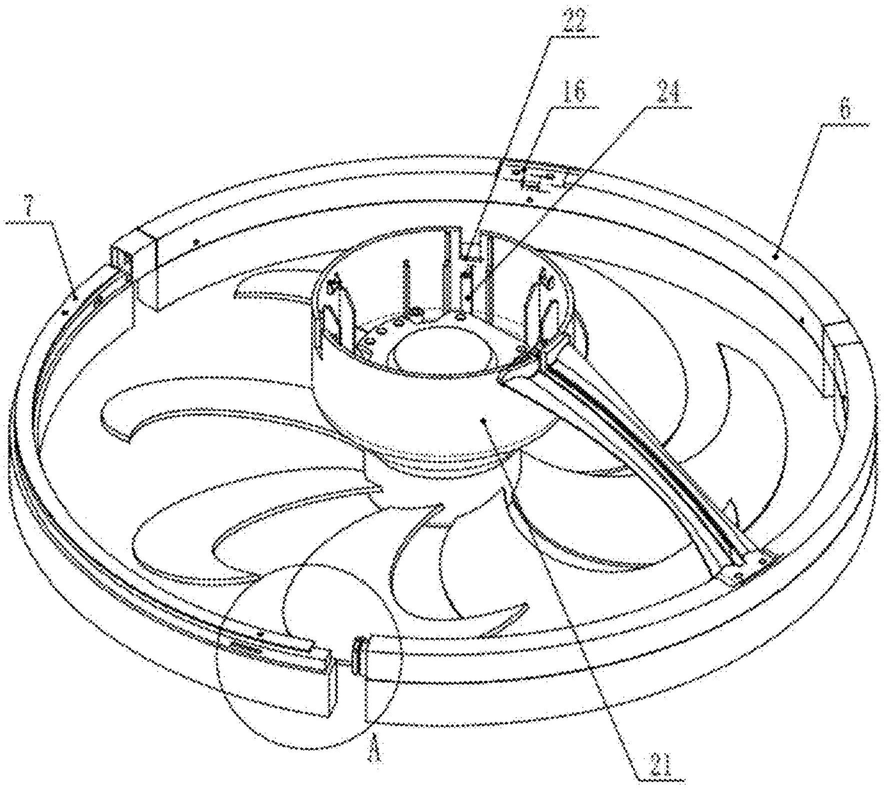
FIG. 5 is a structural schematic diagram of FIG. 4 with part of the structures omitted.
Figure 6:
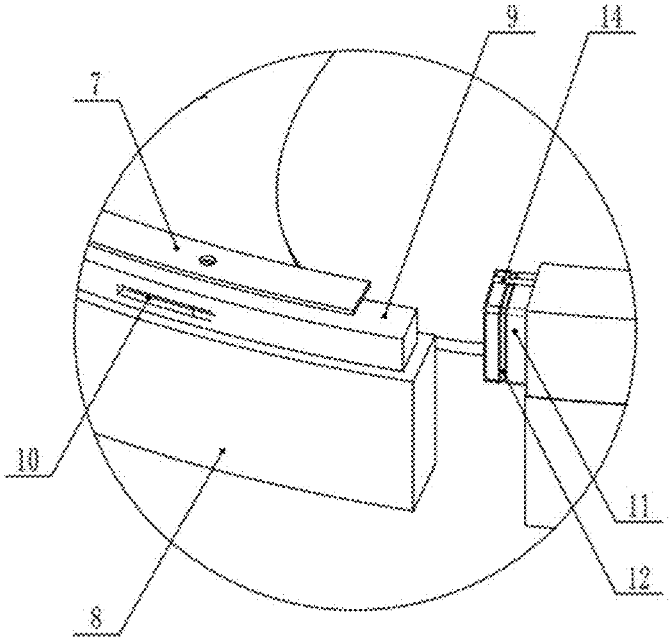
FIG. 6 is a partial enlarged schematic diagram of position A in FIG. 5.
Figure 7:
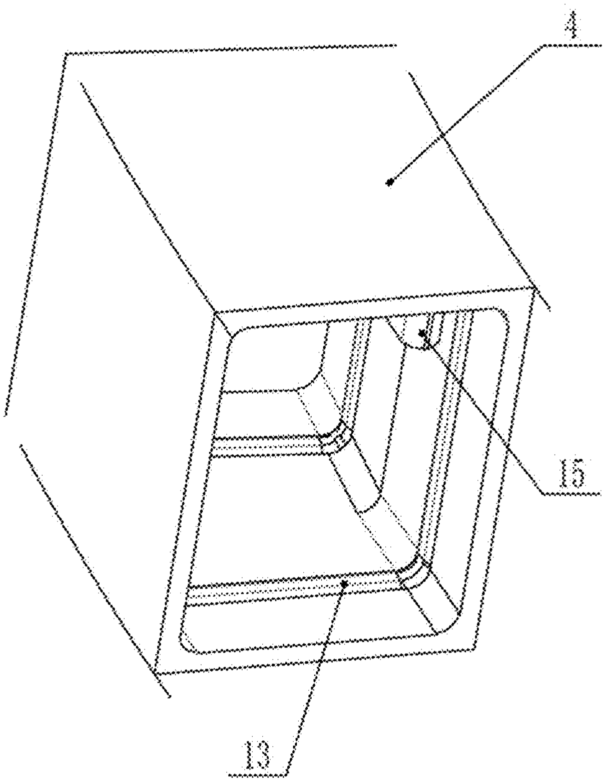
FIG. 7 is a structural schematic diagram of the connector in FIG. 1.
Figure 8:
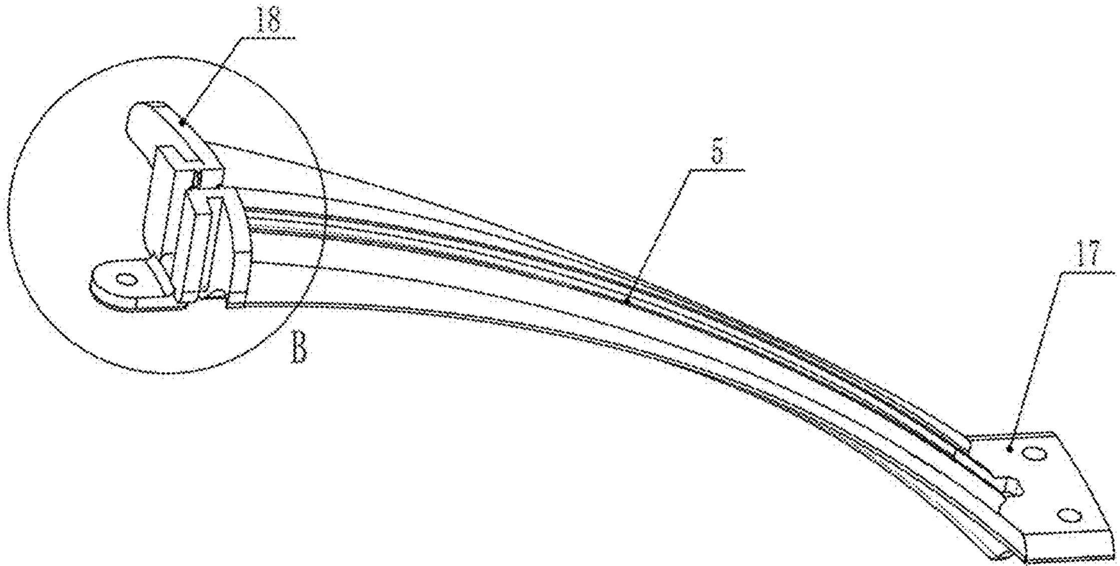
FIG. 8 is a structural schematic diagram of the supporting member in FIG. 1.
Figure 9:
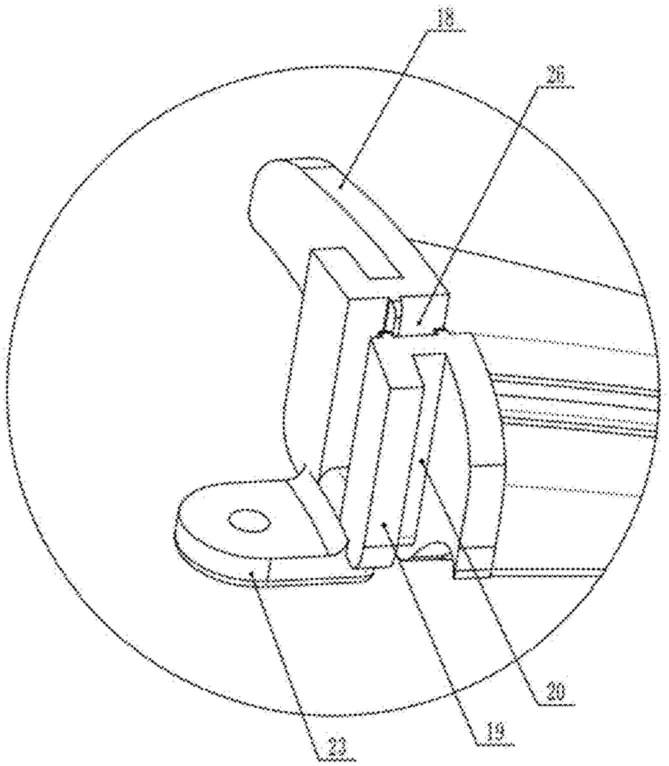
FIG. 9 is a partial enlarged schematic diagram of position B in FIG. 8.

The present disclosure will be further described below in conjunction with the accompanying drawings and embodiments. It should be noted that in the description of the present disclosure, the directional or positional relationships indicated by terms such as “upper”, “lower”, “left”, “right”, “inner” and “outer” are based on the orientations or positional relationships shown in the accompanying drawings. Such terms are merely used for the purpose of facilitating the description of the present disclosure and simplifying the description, rather than indicating or implying that the referred apparatus or elements must have specific orientations or be constructed and operated in specific manners. Therefore, these terms are not to be construed as a limitation on the present disclosure. The terms “first”, “second”, “third” and the like are merely used for descriptive purposes and may not be understood as indicating or implying relative importance.

As shown in FIGS. 1 to 9, a split-type fan lamp structure includes an installation housing 1, wherein a fan blade structure 2 is arranged below the installation housing 1, and an installation space is formed inside the installation housing 1 for installing and arranging a driving mechanism; a driving end of the driving mechanism extends downwards through a clearance hole at the bottom of the installation housing 1 and is connected to the fan blade structure 2; a plurality of lamp body modules 3 are arranged outside the outer contour of the fan blade structure 2; the lamp body modules 3 as a whole are elongated and curved with an arc-shaped structure; any two adjacent lamp body modules 3 are connected by a connector 4, and a plurality of lamp body modules 3 are assembled into an annular structure; a supporting member 5 is connected and fixed on the lamp body module 3; the supporting member 5 as a whole is of an elongated structure, and the distal end of the supporting member 5 is connected and fixed on the installation housing 1.

In this way, the above split-type fan lamp structure has the following characteristics: the installation housing 1, the fan blade structure 2, the lamp body modules 3, the connector 4 and the supporting member 5 are disassembled. After disassembly, each component has a smaller structural size, thereby facilitating packaging and transportation, and saving packaging and transportation costs; secondly, the fan blade structure 2 and the lamp body modules 3 are located in the same horizontal direction, so the structural arrangement is more reasonable. When assembled for use, the vertical size of the entire structure is more compact, thereby facilitating installation and saving installation space.

In this specific embodiment, the lamp body module 3 includes an installation member 6, the installation member 6 as a whole is designed to be elongated and curved with an arc-shaped structure, and adjacent ends of any two installation members 6 are connected by the connector 4; an installation groove is arranged on the lower surface of the installation member 6, and an LED lamp board 7 is arranged in the installation groove; a lampshade block 8 is installed below the installation member 6, and the lampshade block 8 is designed to be elongated and curved with an arc-shaped structure.

In this way, by designing the installation members 6, connecting the installation members 6 through connectors 4, arranging LED lamp boards 7 in the installation grooves of the installation members 6, and then setting the lampshade blocks 8 below the installation members 6, the structural design of the lamp body module 3 is simpler and more reasonable, and the lighting effect is better.

Figure 10:
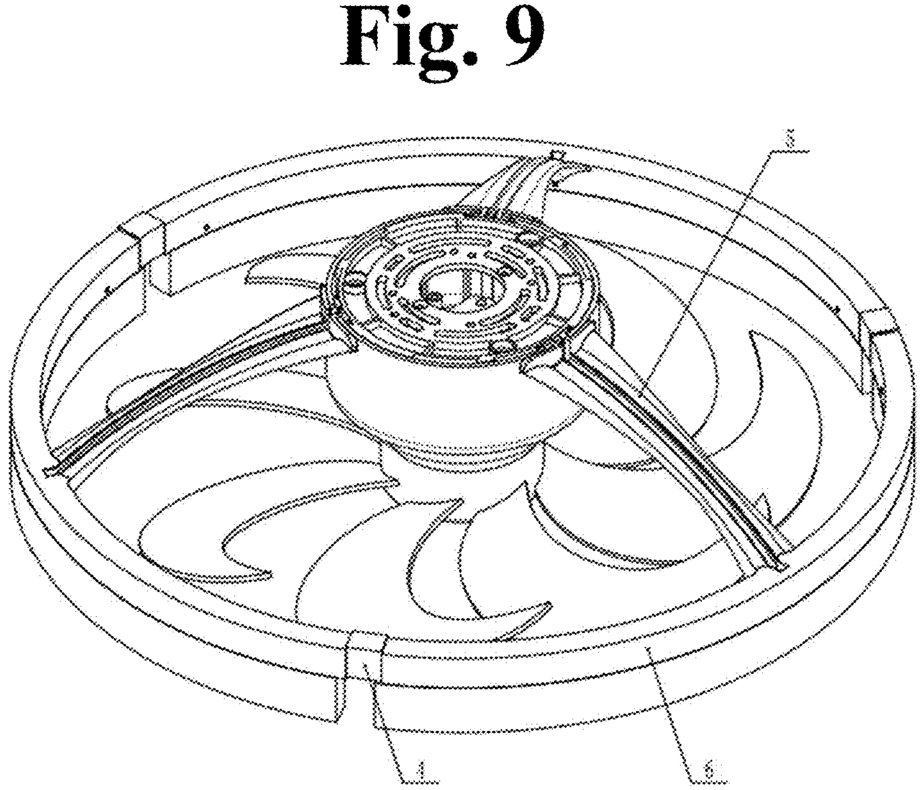
FIG. 10 is a structural schematic diagram of another structural form of the fan lamp in a specific embodiment of the present disclosure (wherein the installation member and the supporting member are formed integrally).

Specifically, one end of the supporting member 5 is connected and fixed at the middle position of the installation member 6, and the installation member 6 and the supporting member 5 are formed integrally (as shown in FIG. 10).

In this specific embodiment, a protruding portion 9 is convexly arranged on the upper surface of the lampshade block 8, and the protruding portion 9 is installed and matched in the installation groove of the installation member 6.

In this way, the structural design is simpler, and the installation and matching between the lampshade block 8 and the installation member 6 are more convenient.

Further, a plurality of sets of clamping recesses 10 are arranged in pairs on both sides of the matching protruding portion 9, clamping protrusions are respectively arranged on both side walls inside the installation groove corresponding to the clamping recesses 10, and each clamping protrusion is correspondingly clamped and matched in the clamping recess 10.

In this way, the installation and matching between the installation member 6 and the lampshade block 8 are more reasonable, and disassembly and assembly are more convenient.

In this specific embodiment, the connector 4 is designed as a rectangular tube structure, an end of the installation member 6 protrudes to form a connecting portion 11, the connecting portion 11 is designed as a rectangular tube structure, and the connecting portion 11 is correspondingly inserted and matched in the connector 4.

In this way, the structural design of the connector 4 is simpler and more reasonable, and two adjacent installation members are better connected.

Further, a connecting groove 12 is arranged on the connecting portion 4 along a circumferential direction of the connecting portion 4, and connecting convex edges 13 are distributed on an inner circumferential surface of the connector 4 along an inner contour of the connector 4. The connecting convex edges 13 are arranged in a protruding manner. After the connecting portion 11 is inserted and matched in the connector 4, the connecting convex edges 13 are clamped and matched in the connecting groove to restrict the connecting portion 11 from coming out of the connector 4.

In this way, the connection between the connector 4 and the installation member 6 is more reliable.

In this specific embodiment, the connecting portion 11 is provided with a vertically through deformed opening 14; a wedge-shaped convex edge 15 is arranged on the upper surface inside the connector 4 and corresponds to the deformed opening 14; and after the connecting portion 11 is inserted and matched in the connector 4, the wedge-shaped convex edge 15 is inserted and matched in the deformed opening 14 to make the connecting portion 11 deform and expand.

In this way, the reliability of the connection between the connector 4 and the installation member 6 is further improved.

In this specific embodiment, a connecting notch 16 is formed on the upper surface of the middle part of the installation member 6, the upper end and the inner side of the connecting notch 16 are designed to be open; a connecting block 17 is arranged at one end of the supporting member 5 and corresponds to the connecting notch 16, and the connecting block 17 is connected and matched in the connecting notch 16 through screws. In this way, the connection and fixation between the supporting member 5 and the installation member 6 are more convenient.

In this specific embodiment, the other end of the supporting member 5 is provided with a fixing block 18, and the fixing block 18 is attached to the outer circumferential surface of the installation housing 1; a matching block 19 is arranged in the middle of the surface of the fixing block 18 opposite to the installation housing 1, and matching grooves 20 are arranged on both sides of the matching block 19; the installation housing 1 includes a housing 21, the housing 21 as a whole is designed as a circular structure with an open upper end, and the open end of the housing 21 is formed with a matching opening 22, and the matching grooves on both sides of the matching block 19 are clamped and matched on both sides of the matching opening 22; the lower end of the fixing block 18 is provided with a fixing protrusion 23, the fixing protrusion 23 extends into the interior of the housing 21 from the matching opening 22, and the fixing protrusion 23 is connected and fixed on a fixing column 24 inside the housing 21 by a fixing screw.

In this way, the connection between the supporting member 5 and the housing 21 is more stable and reliable, and disassembly and assembly are also convenient.

In this specific embodiment, the installation housing 1 further includes a hanging plate 25, and the hanging plate 25 is installed inside the open end of the housing 21.

In this way, the structure of the installation housing 1 is simpler, and the installation of the entire device is more convenient.

In this specific embodiment, a deformed opening 26 is further arranged at the middle position of the upper end surface of the fixing block 18, the deformed opening 26 is arranged along a thickness direction of the fixing block 18, and the inner side of the deformed opening 26 is arranged to penetrate through the matching block 19.

In this way, by designing the deformed opening 26, the convenience during assembly and disassembly is improved.

Specifically, the supporting member is obtained by die-casting.

In this specific embodiment, three lamp body modules 3 are arranged.

In this way, the quantity design of the lamp body modules 3 is more reasonable.

To sum up, the above split-type fan lamp structure has the characteristics of a simpler and more reasonable structural design, convenient disassembly and assembly of each part of the lamp, and reduction in the size of each part after disassembly to reduce packaging and transportation costs.

Preferred specific embodiments of the present disclosure are described in detail above. It should be understood that those skilled in the art may make numerous modifications and changes according to the concept of the present disclosure without any creative effort. Therefore, all the technical solutions that are obtained by those skilled in the art through logical analysis, reasoning, or limited experiments on the basis of the prior art according to the concept of the present disclosure shall fall within the protection scope defined by the claims.

What is claimed is:

1. A split-type fan lamp structure, comprising an installation housing, wherein a fan blade structure is arranged below the installation housing, and an installation space is formed inside the installation housing for installing and arranging a driving mechanism; a driving end of the driving mechanism extends downwards through a clearance hole at the bottom of the installation housing and is connected to the fan blade structure; a plurality of lamp body modules are arranged outside the outer contour of the fan blade structure; the lamp body modules as a whole are elongated and curved with an arc-shaped structure; any two adjacent lamp body modules are connected by a connector, and a plurality of lamp body modules are assembled into an annular structure; a supporting member is connected and fixed on the lamp body module; the supporting member as a whole is of an elongated structure, and the distal end of the supporting member is connected and fixed on the installation housing;

wherein the lamp body module comprises an installation member, the installation member as a whole is elongated and curved with an arc-shaped structure, and adjacent ends of any two installation members are connected by the connector; an installation groove is arranged on the lower surface of the installation member, and an LED lamp board is arranged in the installation groove; a lampshade block is installed below the installation member, and the lampshade block is elongated and curved with an arc-shaped structure.

2. The split-type fan lamp structure of claim 1, wherein a protruding portion is convexly arranged on the upper surface of the lampshade block, and the protruding portion is installed and matched in the installation groove of the installation member.

3. The split-type fan lamp structure of claim 1, wherein the connector is in a rectangular tube structure, an end of the installation member protrudes to form a connecting portion, the connecting portion is in a rectangular tube structure, and the connecting portion is correspondingly inserted and matched in the connector.

4. The split-type fan lamp structure of claim 3, wherein the connecting portion is provided with a vertically through deformed opening; a wedge-shaped convex edge is arranged on the upper surface inside the connector and corresponds to the deformed opening; and after the connecting portion is inserted and matched in the connector, the wedge-shaped convex edge is inserted and matched in the deformed opening to make the connecting portion deform and expand.

5. The split-type fan lamp structure of claim 1, wherein a connecting notch is formed on the upper surface of the middle part of the installation member, the upper end and the inner side of the connecting notch are open; a connecting block is arranged at one end of the supporting member and corresponds to the connecting notch, and the connecting block is connected and matched in the connecting notch through screws.

6. The split-type fan lamp structure of claim 5, wherein the other end of the supporting member is provided with a fixing block, and the fixing block is attached to the outer circumferential surface of the installation housing; a matching block is arranged in the middle of the surface of the fixing block opposite to the installation housing, and matching grooves are arranged on both sides of the matching block; the installation housing includes a housing, the housing as a whole is in a circular structure with an open upper end, and the open end of the housing is formed with a matching opening, and the matching grooves on both sides of the matching block are clamped and matched on both sides of the matching opening; the lower end of the fixing block is provided with a fixing protrusion, the fixing protrusion extends into the interior of the housing from the matching opening, and the fixing protrusion is connected and fixed on a fixing column inside the housing by a fixing screw.

7. The split-type fan lamp structure of claim 6, wherein the installation housing further comprises a hanging plate, and the hanging plate is installed inside the open end of the housing.

8. The split-type fan lamp structure of claim 6, wherein a deformed opening is further arranged at a middle position of the upper end surface of the fixing block, the deformed opening is arranged along a thickness direction of the fixing block, and the inner side of the deformed opening is arranged to penetrate through the matching block.

9. The split-type fan lamp structure of claim 1, wherein three lamp body modules are arranged.

* * * * *